Oct. 15, 1940.     M. TIESCH     2,218,186
GASKET CUTTING MACHINE
Filed June 6, 1938     3 Sheets-Sheet 3
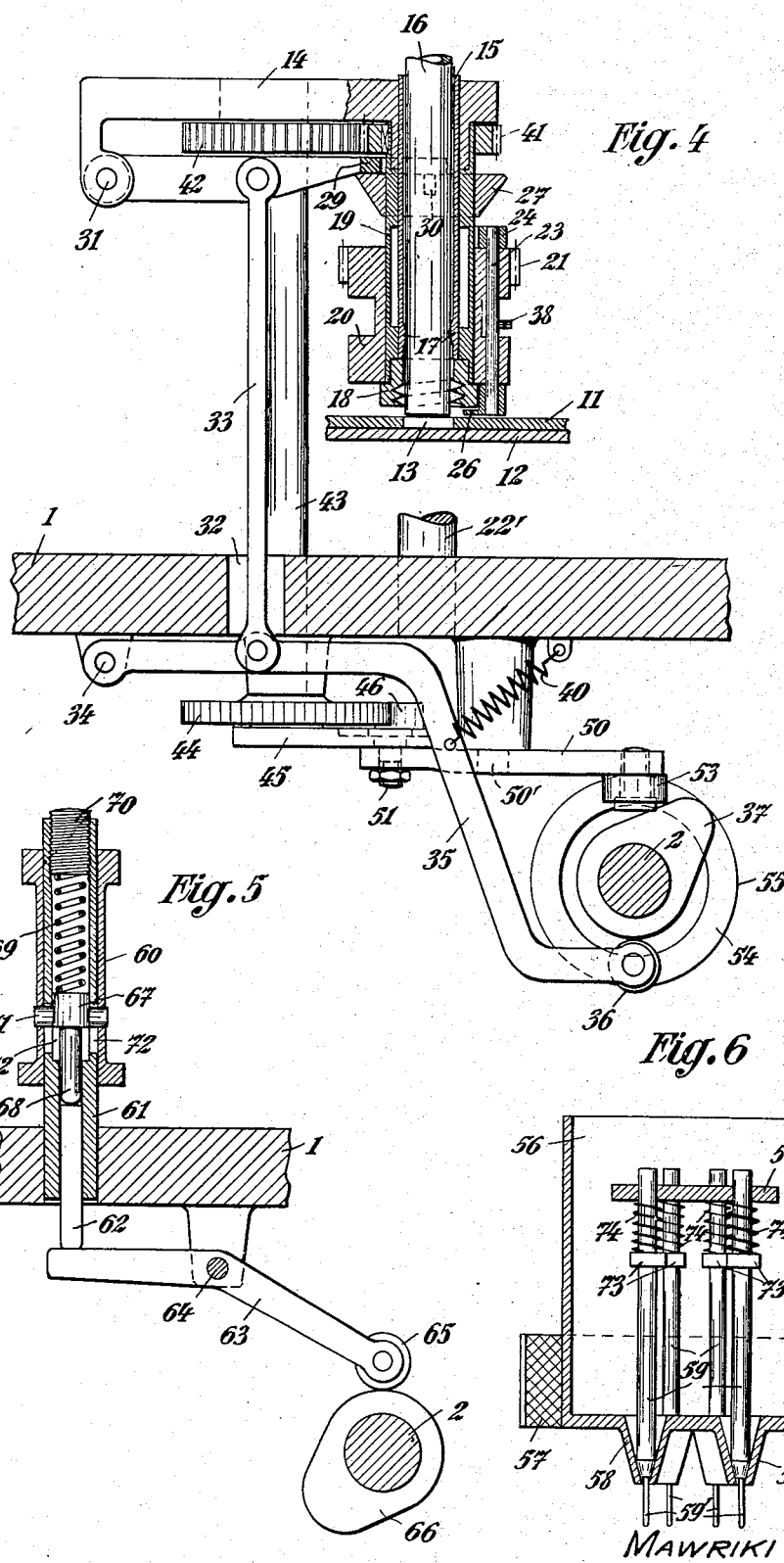
INVENTOR
MAWRIKI TIESCH.
BY
Karl A. Mayr
ATTORNEY Patented Oct. 15, 1940

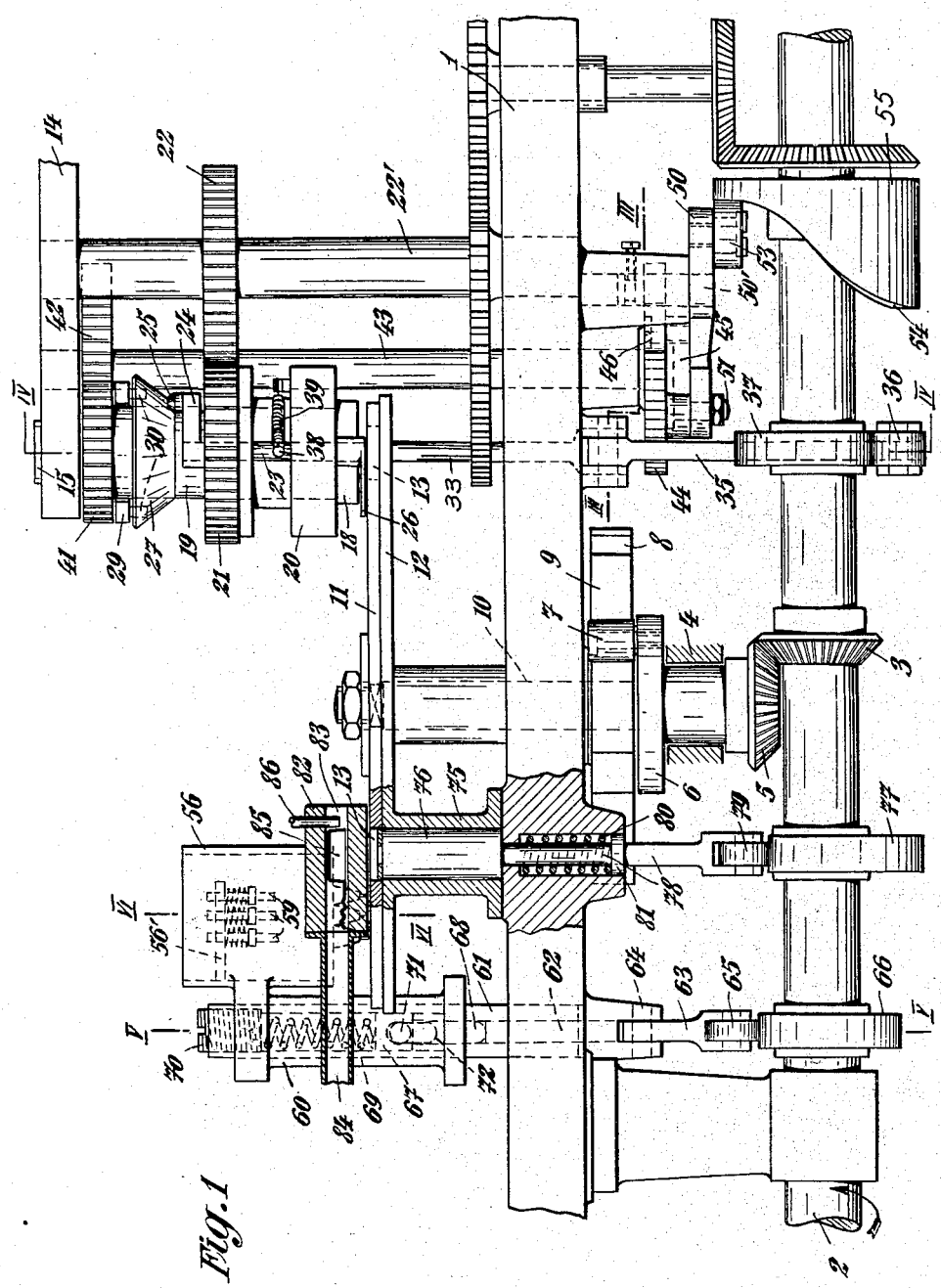

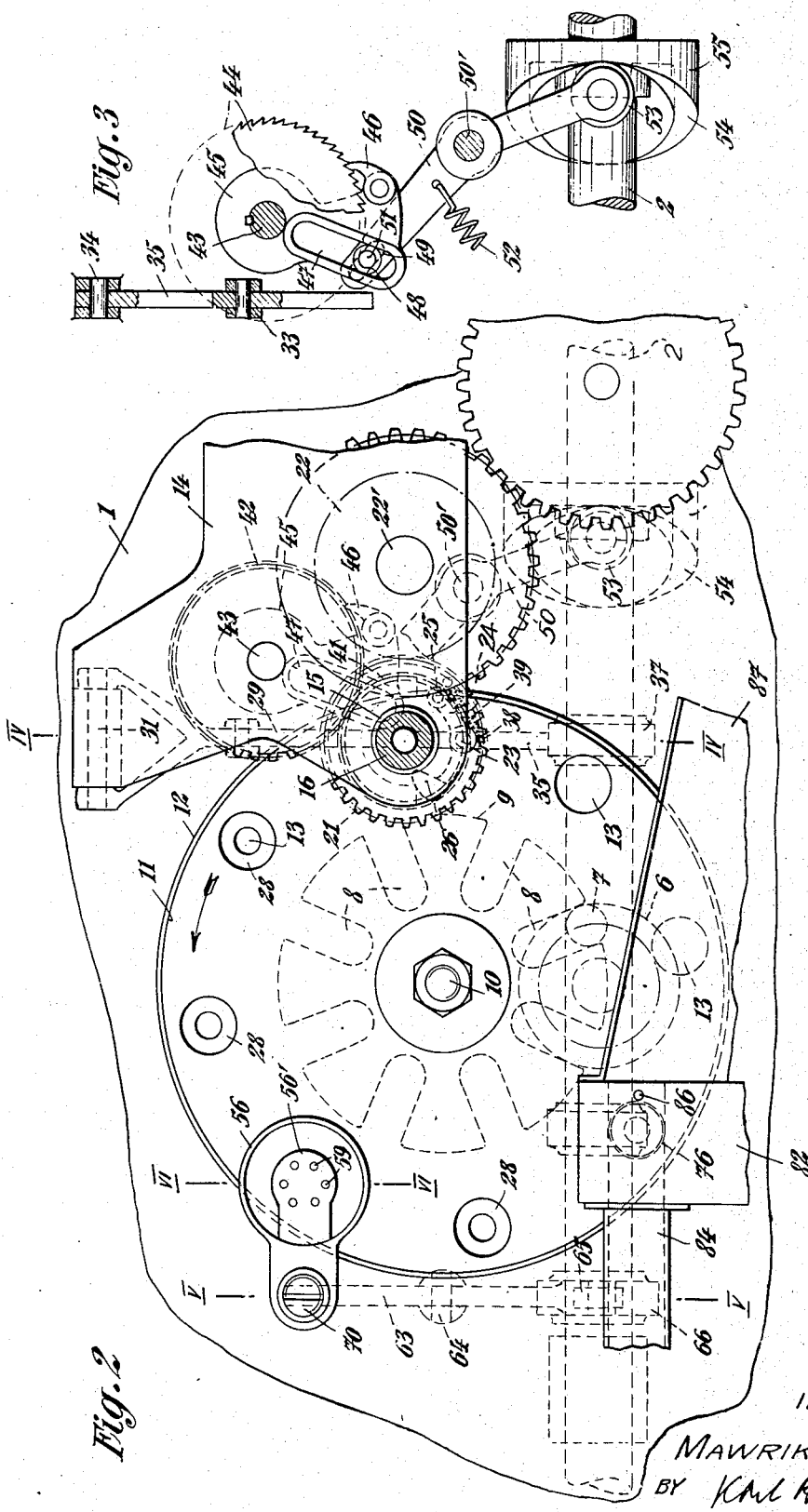

2,218,186

UNITED STATES PATENT OFFICE 2,218,186

GASKET CUTTING MACHINE

Mawriki Tiesch, New York, N. Y.

Application June 6, 1938, Serial No. 212,214
In Austria November 13, 1937

10 Claims. (Cl. 144—21)

This invention relates to the production of gaskets for closure caps, particularly for use in sealing bottles. The method of production according to the invention consists essentially in cutting the gasket, in the immediate vicinity of the place where tin is to be united to the cap, from a continuous longitudinal body having a cross-section corresponding to the desired shape and size of the gasket disc, if necessary applying adhesive thereto, and then uniting the gasket thus obtained to the cap, if desired or necessary with the application of heat. A particularly practical and favorable working cycle is obtained if the continuous longitudinal body of gasket material is extruded intermittently from an orifice or mouthpiece, being advanced at each intermittent movement by the amount of the thickness of the gasket to be obtained, the protruded portion severed by means of a cutting implement adapted to carry out an appropriate operative movement for this purpose, the gasket brought by means of a conveying device into position for union with the cap, and the gasket pressed against and united with the cap by means of a piston or the like.

The invention also relates to a machine for carrying out the method outlined above. A form of construction of this machine is shown, by way of example, in the accompanying drawings, in which:

Fig. 1 is a side elevation, partly in section.
Fig. 2 is a plan view of the same.
Fig. 3 is a section taken on the line III—III of Fig. 1.
Figs. 4, 5, and 6 are sections taken on the lines IV—IV, V—V, and VI—VI, respectively, of Figs. 1 and 2.

Referring to the drawings, beneath a plate 1 pertaining to the framework of the machine there is journalled a shaft 2 which is driven by a motor not shown in the drawings, and on which there is secured a bevel gear wheel 3 meshing with a bevel gear wheel 5 journalled in a bearing 4. The boss of the bevel gear wheel 5 is coupled with a disc 6 on which there is mounted a roller 7 (Figs. 1 and 2) adapted to engage, on rotation of the bevel gear wheel 5, in a slot 8 in a feed disc 9 thereby causing this disc to rotate through an angle of 45°. The feed disc is mounted on a shaft 10 in the plate 1, which shaft carries on its free end a disc 11 rotatable over a stationary plate 12 and having, uniformly distributed over its circumference, eight recesses 13 for the reception of the gaskets. The arrestment of the feed disc 9 in its feed positions is effected in a conventional manner, with the aid of means not shown in the drawings, e. g. by means of a pawl lever controlled by the driving mechanism. Above and slightly spaced from the disc 11 there is secured, in a bearing bracket 14 attached to the framework of the machine, a length of tube 15 through which the column of rodlike or tubular gasket material 16 (Fig. 4), such as rubber, cork, or the like is delivered, this column of material being prevented from rotating by means of sharp-edged ribs 17 provided on the inside of the lower end portion of the tube 15. In front of the orifice of the tube 15, which with the ribs 17 forms a holder for the column of material, there is provided a nut 18 which is firmly mounted on a sleeve 19 mounted on the tube 15, and which engages with the turns of its screw threading in the envelope of the column of gasket material 16. Idly rotatable on the sleeve 19 is a boss 20 which with teeth 21 meshes with a gear wheel 22 (Figs. 1 and 2) which is keyed to a shaft 22′ and which is set in rapid rotation by the driving motor or from the shaft 2, through the intermediary of transmission gearing. In the boss member 20, parallel to the axis of rotation thereof, there is journalled a rotary pin 23 (Fig. 1) which carries at one end an arm 24 with a roller 25 and at the other end a knife 26 which may also be termed a cutter or slicer adapted to oscillate closely in front of the nut 18 in a plane at right angles to the axis of rotation thereof. On the sleeve 19 there is slidably mounted a ring 27 which is tapered on the outside and adapted, when shifted, to press against the roller 25 on the arm 24 and move the latter outwards, with the result that the knife 26 carries out an oscillatory movement against the projecting end of the column 16, which in the present instance is of hollow cylindrical shape, and in revolving about the same, owing to being mounted on the boss member 20, cuts off an annular gasket 28. For the axial feed movement of the ring 27 there is provided a fork 29 which holds the ring 27 by means of pins 30, is oscillatable about a pin 31 (Fig. 4) on the bearing bracket 14, and coupled, by means of a tension rod 33 passed through an aperture 32 in the plate 1, with a lever 35 pivoted about a pin 34, provided at its free end with a roller 36, and adapted to coact with a cam 37 on the shaft 2. A spring attached to the boss member 20 and to a stud on the side of the rotary pin 23 (spring 39 in Fig. 1) retains the knife in its inoperative position and presses the roller 25 constantly against the conical outer surface of the ring 27. By means of a spring 40 (Fig. 4) the lever 35 together with the roller 36 is drawn constantly against the cam 37. To the sleeve 19 there is secured a toothed wheel 41 meshing with a gear wheel 42 keyed to a shaft 43 which is journalled in the plate 1 and bearing bracket 14, and on which there are also mounted, fast and loosely respectively, a ratchet wheel 44 and an arm 45. The arm 45 carries a pawl 46 which engages with the ratchet wheel 44, and has a slot 47 (Fig. 3) in which there engages a roller 48 mounted on a pin 51 which is adjustable in a slot 49 in a two-armed lever 50. The lever 50 is pivoted in the plate 1 about a pin 50', is stressed by a spring 52, and carries on its free end a roller 53 with which it is pressed against a cam surface 54 on a cam plate attached to the shaft 2. By adjustment of the pin 51 in the slot 49 the extent of the reciprocating movement transmitted to the arm 45 by the cam plate 55 through the intermediary of the lever 50 may be varied, whereby the intermittent rotary movement transmitted to the ratchet wheel through the intermediary of the pawl 46 is imparted, through the gear wheels 42, 41 to the sleeve 19 and thus to the nut 18 which, owing to the engagement of the screw threading in the column of material 16 held fast against rotation, draws a correspondingly larger or smaller piece of this column out of the holder.

Offset relatively to the nut 18 in the direction of movement of the disc 11 (see arrow in Fig. 2) there is provided a container 56 for the reception of a liquid adhesive which is constantly heated up and kept thinly liquid by means of an electric resistance heating coil 57 (Fig. 6). At the bottom of the container 56 there are disposed nozzles 58 for the escape of the adhesive. These nozzles are closed by stationary valve needles 59 the tapered ends 59' of which extend out of the nozzles 58 towards the disc 11, while their upper ends are guided in a plate 56' which is rigidly connected with container 56. The container 56 is mounted on a hollow pin 61 pertaining to the plate 1 and is adapted to be raised and lowered thereon by means of a sleeve 60 (see Figs. 2 and 5). At the lower end of the pin 61 there is guided a thrust pin 62 which rests upon a two-armed lever 63 pivoted at 64 on the plate 1 and furnished at its free end with a roller 65 coacting with a cam 66 on the shaft 2. In the upper, tubular portion of the pin 61 there works a piston 67 the rod 68 of which rests upon the pin 62 under the action of a spring 69. The tension of the spring 69 is adjustable by means of a grub screw 70. To the piston 67 is secured a cotter 71 which extends through opposed slots 72 in the hollow pin 61 and engages in holes in the sleeve 60. In Fig. 5 sleeve 60 which is rigidly connected with container 56 is shown in uppermost position. Upon revolution of shaft 2 cam 66 causes lever 63 to move counterclockwise whereby pin 62 and thereby rod 68 and sleeve 60 and container 56 connected thereto are lowered. Upon further revolution of shaft 2, roller 65 cooperates with the small portion of cam 66 and lever 63 moves clockwise back into the position shown in Figure 5. Pin 62 and plunger 67, 68 riding thereon are thereby pushed upward and sleeve 60 which is connected with plunger 67, 68 by means of cross pin 71 together with container 56 which is rigidly connected with sleeve 60 is brought to its raised position. The slight difference between the force of spring 69 which spring urges sleeve 60 and the container downward against the action of springs 74 is overcome by the weight of the right arm of lever 63 and of roller 65 which weight permanently assures contact of said roller and cam 66. In addition, a spring may be provided interconnecting the left arm of lever 63 and the plate 1. When roller 65 rides on the small portion of cam member 66 and is in the position shown in Fig. 5 the container 56 is in the raised position the valve needles 59 are pressed against the nozzles 58 by springs 74 acting on and pressing plate 56' upward and resting on collars 73, to prevent the escape of adhesive during the rotary movement of the disc 11.

Offset in the direction of rotation of the disc 11 by the amount of two feed steps of the same there is provided adjoining the plate 12, and resting upon the plate 1, a guide 75 (Fig. 1) for a piston 76 which at each position of rest of the disc 11 is capable of passing through the recess 13 situated thereabove. The piston 76 is raised and lowered at each revolution of the shaft 2, by a cam 77 provided on this shaft, for which purpose the piston rod 78 is furnished at its end with a roller 79. The roller 79 is kept in contact with the cam 77 by means of a spring 80 which bears on the one hand against the plate 1 and on the other hand against a collar 81 on the rod 78. Above the disc 11 there is mounted a carrier 82 which is connected with the plate 1, and adjoining the transverse slot 83 in this carrier there is placed the orifice of the feed conduit 84 for the closure caps 85 to be furnished with gaskets. A pin 86, which holds the caps 85 fast over the piston 76 as they come from the conduit 84, is raised and lowered in a conventional manner by a control device which is not shown in the drawings, for the purpose of enabling the liberation of the finished cap and the arresting of the next cap to be effected after the uniting of cap and gasket. The bringing up and taking away of the caps is effected in the usual manner by means of a current of air. After liberation by the pin 86, the finished caps pass down a chute 87 (Fig. 2) into a receiver.

The mode of operation of the machine is as follows:

If the shaft 2 be driven as indicated by the arrow in Fig. 1 the roller 7, owing to the drive effected by the bevel gear wheels 3, 5, engages, on approximately the first half revolution of the shaft 2, in the slot 8 (Fig. 2) in the feed disc, and rotates the disc 11, together with the gaskets 28 reposing in the recesses 13 between the gasket material feed device (nut 18) and the place of attachment (piston 76) to the cap 85, one step forward, while at the same time, by raising and lowering of the pin 86, the last cap to become finished is liberated and the next cap held fast in front of the piston. At the same time the column of gasket material 16 is moved on downwards through one feed interval amounting to the thickness of the finished gasket. The forward feeding or advancing of the column of gasket material 16 is initiated by the cam plate 55 (Figs. 1 and 3) which, during the first half revolution, by means of its cam surface 54, swings the roller 53 with its lever 50 against the action of the spring 52, and at the same time, by the engagement of the roller 48 on the pin 51 in the slot 47, imparts a rocking movement to the arm 45, so that the pawl 46, by engaging in the ratchet wheel 44, rotates this latter to an appropriate extent. This rotary movement is transmitted, through the shaft 43, the gear wheels 42, 41, and the sleeve 19, to the nut 18 which draws the nonrotatable column 16 out of the holder by an amount corresponding to the thickness of the finished gasket. On the second half revolution of the shaft 2 there are effected, while the disc 11 is at a standstill, the severing of the extruded piece of the column of gasket material, the lowering of the adhesive container for the purpose of applying adhesive to the gasket situated therebeneath, and the uniting of cap and gasket by means of the piston 76. By means of the cam 37 (Figs. 1, 2, and 4) the lever 35 is moved downwards against the force of the spring 40, and the pivoted fork 29 likewise drawn downwards by the action of the tension rod 33, so that the ring 27 moves the arm 24, through the intermediary of the roller 25 (Figs. 1 and 4), and the cutter 26 attached to the pin 23 severs the protruding end of the column of gasket material from the main body thereof. The severed gasket drops into the recess 13 in the disc 11 situated beneath it. On the descent of the adhesive container, which is initiated by the cam 66, the ends 59' of the valve needles 59 strike against the gasket 28 situated therebeneath and thus open the nozzles 58 against the force of the springs 74. By the use of thrust pins 62 of different lengths the clearance between the container and the disc 11 may be varied, so that in this manner the extent of the opening of the nozzles 58 may be regulated, in that by the use of a longer or shorter pin 62 the container is set at a higher or lower level and the nozzles are consequently opened to a greater or less extent. The gasket 28 provided with adhesive and brought into position over the plunger 76 by the intermittent rotary advancing movement of the disc 11 is pushed by this plunger into the cap 85 situated thereabove, which is effected by means of the cam 77 (Fig. 1) which lifts the plunger rod 78 against the force of the spring 80. The described cycle of operations is repeated at the next revolution of the shaft 2.

The machine for the carrying out of the method according to the invention is not limited to the described constructional example, and is adapatable for all kinds of closure caps, particularly for tear-off and crown-cork caps. Instead of applying adhesive to the gaskets it is also possible to apply to them in a known manner a paper disc spread on both sides with heat-sensitive adhesive, which is then united to the gasket and to the cap by the application of a heated plunger. The intermittent advancing of the column of gasket material towards the cutter may also be effected with the aid of feed rollers. With the aid of the method according to the invention it is possible to use any material suitable for jointing, including for example rubber, thus obviating the difficulties that have hitherto stood in the way of using materials of this nature, and it is also possible to reduce the thickness of the gaskets to such an extent that they are only just thick enough to equalize out unevennesses in the caps, which implies a considerable saving of material as compared with the hitherto known gaskets fed to capping machines in the finished state in stacks. Moreover, the cross-sectional shape of the column of gasket material used is immaterial, so that it is perfectly possible, as in the described example, to feed in this material in the form of a hollow column, and thus to effect an appreciable saving of material. If desired, the column of gasket material may be arranged to carry out a rotational movement in addition to its forward feed movement, so that the cutter need merely carry out an oscillating movement without revolving about the axis of the column of material to be cut through.

I claim:

1. A machine for producing gaskets by slicing same from rodlike or tubular work material, said machine comprising a power driven shaft, material cutting means, a feed mechanism associated with said cutting means and feeding the work material from which the gaskets are made to said cutting means, said feed mechanism comprising a hollow cylindrical material holder which surrounds the work material to be fed to said cutting means, a rotary work material feeder adjacent to one end of said holder and having an internal thread which firmly engages the material axially emerging from said holder, a cylindrical extension connected with said feeder and surrounding said holder, a drive shaft operatively connected with said extension for rotating said extension and feeder, connecting means operatively connecting said power driven shaft and said drive shaft, said connecting means comprising a ratchet wheel which is connected with said drive shaft, a two arm lever, a ratchet pawl which is slidingly movably and directly connected to one arm of said lever, and a cam member connected with said power driven shaft and movably engaging the other arm of said lever for swinging said lever and thereby, by means of said pawl, intermittently driving said ratchet wheel and drive shaft.

2. A machine for producing gaskets by slicing same from rodlike or tubular work material, said machine comprising a power driven shaft, material cutting means, a feed mechanism associated with said cutting means and feeding the work material from which the gaskets are made to said cutting means, said feed mechanism comprising a hollow cylindrical material holder which surrounds the work material to be fed to said machine, a rotary work material feeder adjacent to one end of said holder and having an internal thread which firmly engages the material emerging from said holder, a cylindrical extension connected with said feeder and surrounding said holder, a drive shaft operatively connected with said extension for rotating said extension and feeder, connecting means operatively connecting said power driven shaft and said drive shaft, said connecting means comprising a ratchet wheel which is connected with said drive shaft, a two arm lever having a slotted arm, a ratchet pawl, a slotted arm swingably connected with said drive shaft and swingably holding said pawl, a connecting member rigidly yet adjustably connected with one of said slotted arms and movably engaging the other slotted arm, whereby, by adjustment of the position of said connecting member in one of said arms, the active length of said lever can be changed, and a cam member connected with said power driven shaft and movably engaging the other arm of said lever for swinging said lever and thereby, by means of said pawl, intermittently driving said ratchet wheel and drive shaft.

3. A machine for producing gaskets by slicing same from rodlike or tubular work material, said machine comprising a power driven shaft having a cam member, slicing means, a feed mechanism for feeding the work material from which the gaskets are made to said slicing means, said feed mechanism comprising a hollow cylindrical holder which surrounds the work material to be fed to said machine, a rotary work material feeder disposed coaxially with and adjacent to one end of said holder and having an internal thread which firmly engages the material axially emerging from said holder, a cylindrical extension connected with said feeder and surrounding said holder, a drive shaft operatively connected with said extension for rotating said extension and feeder, connecting means operatively connecting said cam member and said drive shaft, another cam member on said power driven shaft, and a connecting mechanism operatively interconnecting said slicing means and said other cam member for alternate synchronized operation of said slicing means and said feeder.

4. A machine for producing gaskets by slicing same from rodlike or tubular work material, said machine comprising a power driven shaft, material cutting means, a feed mechanism associated with said cutting means and feeding the work material from which the gaskets are made to said cutting means, said feed mechanism comprising a hollow cylindrical holder which surrounds the work material to be fed to said machine, a rotary work material feeder disposed coaxially with and adjacent to one end of said holder and having an internal thread which firmly engages the material emerging from said holder, a cylindrical extension connected with said feeder and surrounding said holder, a drive shaft operatively connected with said extension for rotating said extension and feeder, connecting means operatively connecting said power driven shaft and said drive shaft, a cutter holder rotatably surrounding said extension and swingably holding said cutter, an operating member axially displaceable on said extension and being adapted to engage and swing said cutting means into work material engaging position upon axial displacement of said operating member, and a connecting mechanism interconnecting said operating member and said power shaft for synchronized operation of said cutting means and said feeder.

5. A machine for producing gaskets by slicing same from rodlike or tubular work material, said machine comprising a power driven shaft, material cutting means, a feed mechanism associated with said cutting means and feeding the work material from which the gaskets are made to said cutting means, said feed mechanism comprising a hollow cylindrical holder which surrounds the work material to be fed to said machine, a work material feeder adjacent to one end of said holder and having an internal thread which firmly engages the material axially emerging from said holder, a cylindrical extension connected with said feeder and surrounding said holder, a drive shaft operatively connected with said extension for rotating said extension and feeder, connecting means operatively connecting said power shaft and said drive shaft, said cutting means comprising a cutter, a cutter stem rigidly connected with said cutter, a stem holder rotatably holding said stem and surrounding said extension, a crank lever on said stem, an operating member axially displaceable on said extension and abuttingly engaging said crank lever and rotating said stem and swinging said cutter into work material engaging position upon axial displacement of said operating member, and a connecting mechanism interconnecting said operating member and said power shaft for synchronized operation of said cutter and said feeder.

6. A machine for producing gaskets by slicing same from rodlike or tubular work material, said machine including a source of power, a continuously rotated material cutter, a feed mechanism for feeding the work material from which the gaskets are made to said cutter, said feed mechanism comprising a material holder, a material feeder adjacent to said holder and frictionally engaging the work material, said cutter being disposed adjacent to and coaxially with said feeder and rotating continuously about the work material axially emerging from said feeder and being adapted to be temporarily moved into cutting engagement with said work material, intermittently acting driving means connected with said feeder, with said cutter and with said source of power and being periodically actuated by said source of power for periodically actuating said feeder and feeding a length of material to said cutter and moving said cutter into cutting engagement with said material.

7. A device for producing gaskets by slicing same from rodlike or tubular work material, said device comprising a work material holder through which the work material enters said device, rotation preventing means associated with said holder and preventing rotation of the work material, a work material feeder having an internal thread and rotating about the axis of said thread, said thread firmly engaging the work material and, upon rotation, pulling said work material from said holder and projecting it from said feeder, material slicing means disposed adjacent to said feeder and being swingable about an axis parallel to the axis of said thread and continuously rotating about said thread and the work material emerging therefrom, temporarily acting swinging means associated with said slicing means and temporarily swinging said slicing means towards the axis of asid thread and into cutting engagement with the work material, said slicing means, when engaging the work material, slicing off the part of the work material projecting from said feeder in a combined circular and radial slicing operation.

8. A machine for producing gaskets by cutting same from rodlike or tubular work material, said machine including, in combination, a source of power, a rotatable material cutter operatively connected with said source and being continuously rotated thereby, a feed mechanism operatively connected with said cutter and being disposed coaxially with said cutter and feeding the work material to said cutter, said feed mechanism comprising a material holder having rotation preventing means slidingly engaging the work material and preventing rotation thereof, and a rotatable material feeder adjacent to said holder and surrounding and slidingly engaging and rotating about the same axis as said cutter and about the work material, and intermittently acting rotating means connected with said feeder and said source of power for periodically rotating said feeder.

9. A machine as set forth in claim 8 and comprising, in the combination, adjusting means connected with said rotating means for adjusting the extent of rotation of said feeder and the length of work material intermittently supplied to said cutter.

10. A machine for producing gaskets by cutting same from rodlike or tubular work material, said machine comprising a power driven shaft, material cutting means, a feed mechanism associated with said cutting means and feeding the work material from which the gaskets are made to said cutting means, said feed mechanism comprising a hollow cylindrical material holder surrounding the work material to be fed to said machine, a work material feeder disposed adjacent to one end of and coaxially with said holder and having an internal thread firmly engaging the material axially emerging from said holder, a cylindrical extension connected with said feeder and surrounding said holder, a drive shaft operatively connected with said extension for rotating said extension and feeder, and connecting means operatively connecting said power driven shaft and said drive shaft.

MAWRIKI TIESCH.